May 10, 1932. J. W. THROPP 1,858,123
ELECTRICALLY CONTROLLED BRAKE
Filed Nov. 18, 1930 3 Sheets-Sheet 1
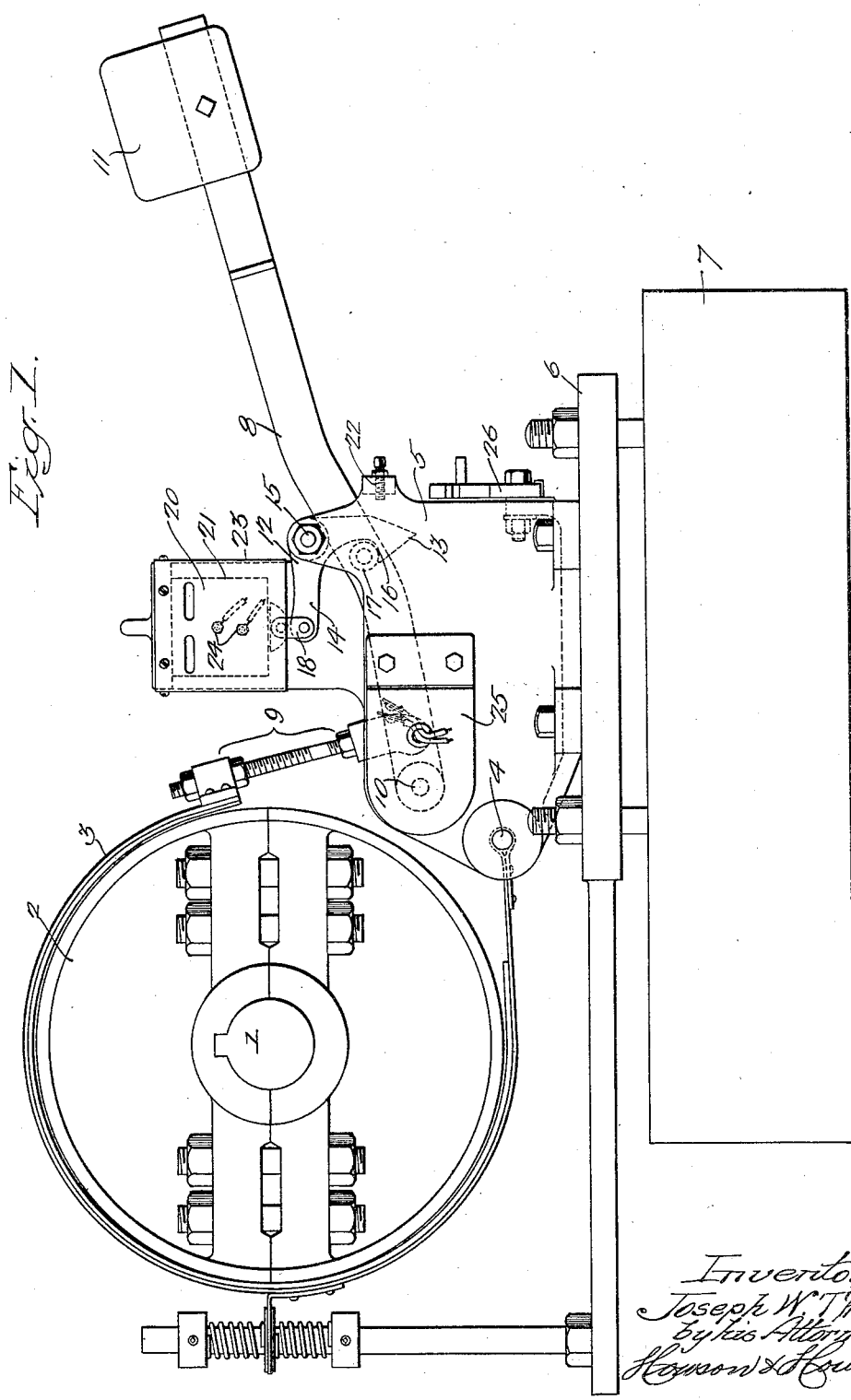

May 10, 1932.  J. W. THROPP  1,858,123
ELECTRICALLY CONTROLLED BRAKE
Filed Nov. 18, 1930   3 Sheets-Sheet 2
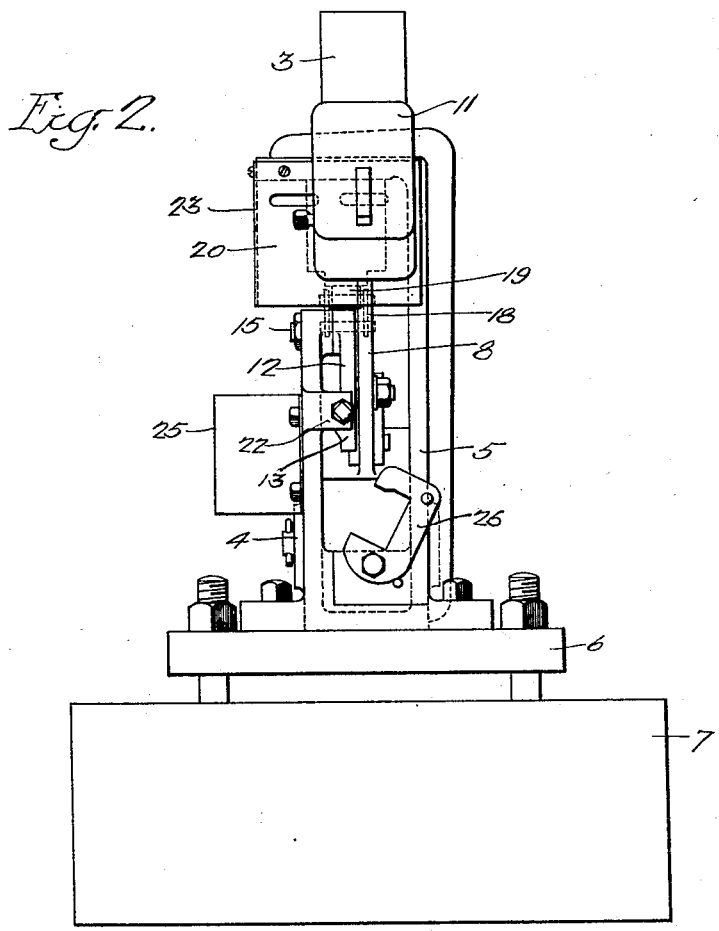

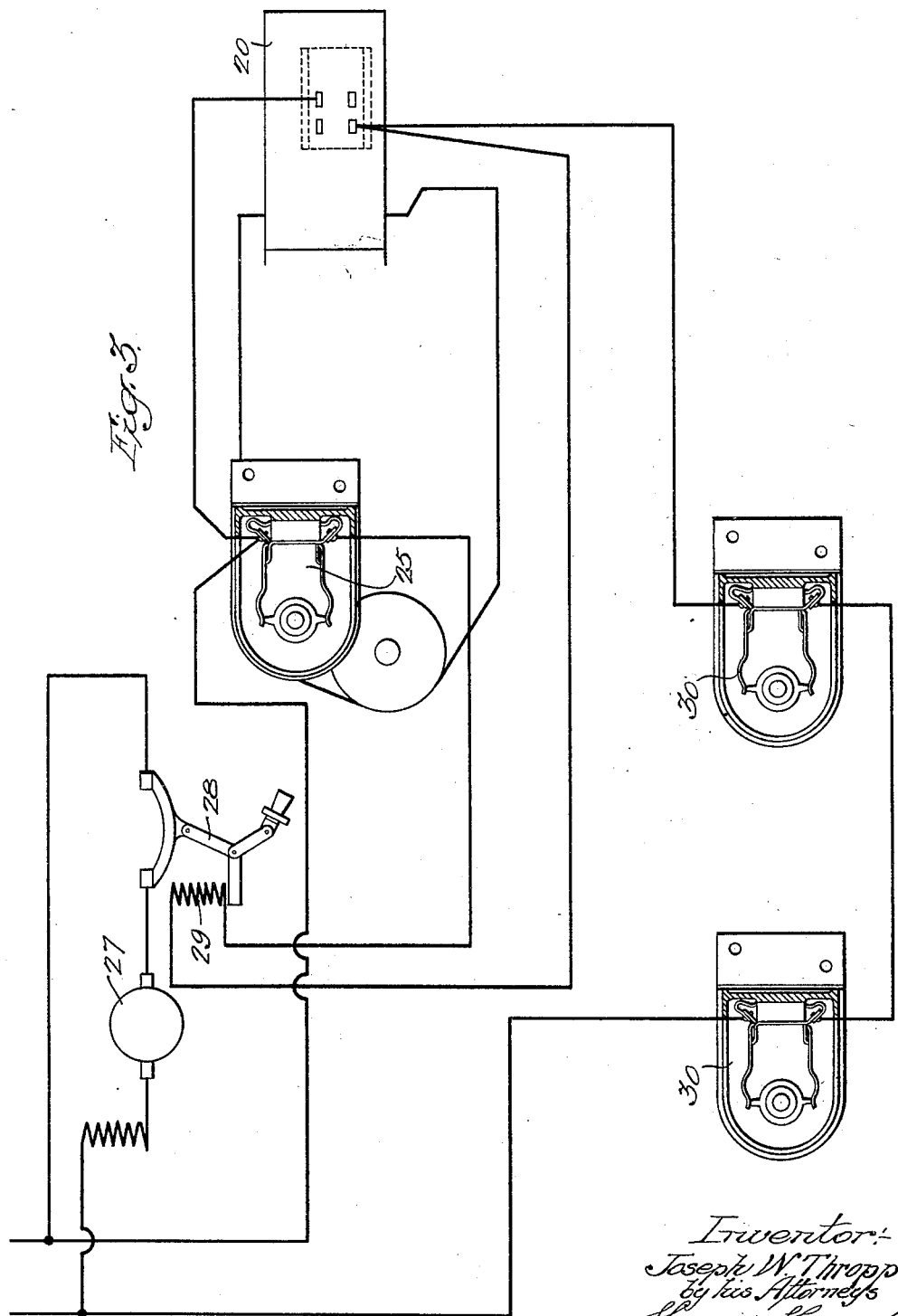

Patented May 10, 1932

1,858,123

UNITED STATES PATENT OFFICE

JOSEPH W. THROPP, OF TRENTON, NEW JERSEY

ELECTRICALLY CONTROLLED BRAKE

Application filed November 18, 1930. Serial No. 496,489.

The present invention relates to electrically controlled brake apparatus adapted particularly for use in safety stop mechanisms of the type disclosed in my Patent No. 1,621,442, dated March 15, 1927. As stated in said patent, such safety stop mechanisms are particularly applicable to machines having exposed rollers where there is danger of the operator being caught between them. A rubber mixing machine constitutes an example of such machines. It will be understood, however, that the invention is not limited to machines of this type.

The invention provides an electrical controlling device for brake apparatus which is in the nature of an improvement over the brake controlling device disclosed and claimed in the above-mentioned patent, the principal object of the present invention being to provide an electrically controlled and gravitally operated brake mechanism which is entirely reliable in its operation.

In the device of the aforesaid patent, solenoid operated latch is provided which is adapted to hold a weighted brake actuating lever arm when energized, and to release the said arm when de-energized. The latch is provided with a surface over which a roller carried by the brake actuating lever is adapted to move. I have found that such a device is not as positive in its action as is necessary in some cases. For example, in some instances the collection of dirt on the roller or co-operating surface of the latch might retard operation of the mechanism. Accordingly, the present invention provides a device which is positive in its action under all conditions, thereby overcoming any inherent defects of the prior device.

In accordance with the present invention, a depending hook-shaped or recessed arm is utilized for holding the brake actuating lever, and while the recessed arm preferably engages a roller carried by the lever to lessen friction and the consequent wear of parts, the device does not depend upon the rolling action of the roller, and will operate regardless of any dirt or foreign matter collecting on the contact surfaces.

Reference may be had to the following detailed description and the accompanying drawings for a complete understanding of the device of the present invention. It will be understood, however, that the disclosure herein of a preferred embodiment of the invention is for illustrative purposes only, and that various changes within the scope of the appended claims may be made without departing from the spirit of the invention.

In the drawings:

Figure 1 is an enlarged detail elevational view showing the brake apparatus to which the invention particularly relates;

Fig. 2 is an end elevation of the apparatus shown in Fig. 1; and

Fig. 3 is a diagram of electrical connections.

Reference may be had, if desired, to the above-mentioned patent for a disclosure and description of a complete rubber mixing machine to which the invention is particularly applicable. For the purpose of the present invention, however, it is deemed unnecessary to show or describe a complete machine, only the parts thereof with which the device of the invention co-operates being disclosed and described in the present application.

Referring to Figs. 1 and 2 of the drawing, there is shown a power shaft 1, which may be the shaft of any machine with which the device of the invention may be used. In the present instance, it is assumed that shaft 1 is the shaft of a rubber mixing machine, as stated above. It will be understood, of course, that the power for driving the said machine and shaft 1 may be derived from any suitable source, such for example, as a mechanically connected electric motor. A brake drum 2 is mounted upon shaft 1, and has associated therewith a suitable brake band 3. One end of the brake band is fastened to a pin 4, which in turn is rigidly carried by the walls of the supporting device 5. The support 5 comprises a pair of parallel vertical walls, and is mounted upon a base plate 6. The plate 6 may in turn be mounted upon a block 7, which may be supported upon the bed plate of the machine with which the device is used. The other end of the brake band 3 is attached to a suitable brake actuating lever 8 by means of an adjustable block and bolt mechanism 9 of known design. The brake actuating lever is pivotally supported upon a pin 10, which may be suitably journaled in the vertical walls of supporting device 5. An adjustable weight 11 is provided upon the end of lever 8, and it will be apparent that the purpose of such weight is to carry the lever downward to apply the brake band to the brake drum to stop rotation of shaft 1.

In accordance with the present invention, I provide a latch device 12 for normally holding the brake actuating lever in raised position, as shown. The latch and its associated mechanism constitutes the main feature of the present invention, the combination thereof with brake apparatus constituting an improvement over the device disclosed and claimed in the above-mentioned patent, as previously stated. The latch 12 comprises a vertically depending arm 13 and a horizontal arm 14 at right angles thereto. This device is pivotally mounted upon a pin 15, which in turn is supported by supporting device 5. The depending arm 13 of the latch is provided with a recess 16 so as to provide a hook-shaped support for co-operating means carried by lever 8. In the present instance, such means takes the form of a roller 17 carried by the lever, although it will be understood that any suitable means may be provided to co-operate with the latch for holding lever 8 in raised position. The recess 16 provided in arm 13 of the device is of such shape and design as to just support lever 8 through the medium of roller 17 when the latch device is in the position shown in Fig. 1. It will be apparent also that lever 8 will exert a force upon the nose of the hook tending to disengage the latch regardless of any contact friction caused by dirt or the like.

Horizontal arm 14 of the latch is connected by means of a link 18 to the armature 19 of a solenoid 20. This solenoid comprises the usual coil or winding 21 through which the core of the armature extends. It will be understood that energization of the coil will cause the same to draw the core of the armature upward, thereby maintaining the latch in the position shown in Fig. 1. De-energization of the solenoid will, however, permit the latch to rotate counter-clockwise upon its pivot. Arm 14 is preferably of such length and weight that it and the parts attached thereto exert a gravitational force tending to move the latch. Any other means may, of course, be used to normally urge the latch counter-clockwise. To limit the movement of latch 12, a stop 22 may be provided and may be mounted upon support 5. It will be apparent that arm 13 will strike the stop to thereby limit movement of the latch. The solenoid may be provided with a suitable housing 23 and terminals or binding posts 24.

It is important to note that by virtue of the construction of the latch and the cooperation therewith of stop 22, the latch is able to swing pivotally a sufficient amount only to allow the release of the brake actuating lever, and the armature of the solenoid is maintained within the attraction range of the solenoid. This is important because it allows the solenoid to reclose its magnetic circuit immediately upon release of the brake lever, thereby preventing the burning out or damaging of the solenoid if it is immediately reenergized. Moreover, the brake may be reset by simply lifting its lever without opening the solenoid energizing circuit. If the solenoid has been reenergized, the roller 17 will ride quickly over the lower surface of the hook-shaped portion of the latch and will disturb the magnetic circuit of the solenoid only momentarily and insufficiently to cause damage or even burn out of the energized solenoid. Thus, it is merely necessary for an operator to lift the brake lever to reset the brake.

A switch 25 may be mounted upon a wall of supporting device 5, such switch being disclosed and described in detail in the aforementioned patent. For the purpose of the present invention, it suffices to state that this switch is adapted to be opened by the brake when it operates and closed when the brake is in inoperative position. This switch forms no part of the present invention, and is merely shown because it is associated with the brake mechanism with which the device of the invention is particularly adapted to cooperate. However, the purpose and operation of switch 25 will be more apparent from the description of Fig. 3 to follow. A rebound clamp 26 may also be provided, and supported upon the end of device 5, although such clamp forms no part of the present invention, but is described in detail and claimed in co-pending application, Serial No. 496,488, filed Nov. 18, 1930. This clamp is adapted to close over the brake actuating lever when the latter descends to apply the brake. It thus prevents rebound of the lever and the consequent undesirable and unsteady operation of the brake.

Fig. 3 shows a diagram of electrical connections of the machine with which the device of the invention may be associated, and clearly shows the manner in which the device is related electrically to other electrical elements of the system. Referring to the figure, 27 designates the motor which drives the rubber mixing machine, the circuit of the motor being provided with the usual circuit breaker 28 having the usual under-voltage release coil 29. Solenoid 20 is connected in series with a pair of safety switches 30 across the supply circuit. Switches 30 likewise form no part of the present invention, being described in detail in the above mentioned patent, and it suffices to state that they are adapted for operation to open the circuit of the solenoid to cause operation of the brake and thereby shut down the machine. It will be apparent that with the switches 30 closed, solenoid 20 is energized and serves to hold the brake actuating lever in elevated position to maintain the brake inoperative. Upon the opening of either switch 30, however, the circuit of the solenoid is opened, thereby de-energizing the same to release the brake-actuating lever and cause application of the brake to stop the machine.

The brake actuated switch 25 and under voltage coil 29 are in series and connected in parallel with solenoid 20. As stated before, switch 25 is normally closed with the brake inoperative, but is opened by the brake when it operates. This makes it impossible for motor 27 to be started again until after the brake mechanism has been manually released. The switches 30 after being opened will ordinarily be closed again, but it will be clear that this action will not cause the machine to start again. Even if the operator should attempt to close the circuit breaker 28, the breaker would immediately re-open for the reason that the circuit of the under-voltage release coil remains broken until the brake mechanism has been released, thus closing the switch 25. After the brake has operated, it will be necessary to manually raise the actuating lever to again render the brake inoperative. If solenoid 20 is energized, the lever will, of course, be maintained in its raised position.

It will be apparent from the above description and accompanying disclosure that the design of the device of my invention causes its operation to be positive and efficient at all times. Upon de-energization of the solenoid which holds the latch, there is no possibility of the latch remaining in its operative position, and it will function to release the brake actuating lever in every instance regardless of the particular conditions. While invention has been illustrated as associated with a safety stop system, it will be apparent that it is applicable to any suitable brake apparatus, since the solenoid may obviously be energized from any suitable source of energy.

While I have disclosed herein a specific embodiment of the device of my invention, it will be apparent that various modifications and changes in the structural details thereof may be made without departing from the scope of the invention. The invention is to be limited only as indicated by the scope of the appended claims.

I claim:

1. In apparatus of the class described, a brake actuating lever, a pivoted latch for holding said lever, said latch having normally horizontally and vertically disposed arms, said vertically disposed arm being formed to provide a hook which just supports said lever when the latch is in operative position, whereby slight pivotal movement of said latch is required for release and resetting of said lever, a solenoid having an armature attached to said horizontally disposed arm for actuating said latch, and a stop disposed adjacent said vertically disposed arm so as to limit the movement of the latch to the required amount, whereby said armature is maintained within the attractive range of said solenoid to prevent damage thereof and said lever may be reset without deenergizing said solenoid.

2. In apparatus of the class described, a brake actuating lever having a roller thereon, a pivoted latch for holding said lever, said latch having normally horizontally and vertically disposed arms, said vertically disposed arm being arcuately recessed to provide a hook which just supports said roller on its nose when the latch is in operative position, whereby slight pivotal movement of said latch is required for release and resetting of said lever, a solenoid having an armature attached to said horizontally disposed arm for actuating said latch, and a stop disposed adjacent said vertically disposed arm so as to limit the movement of the latch to the required amount, whereby said armature is maintained within the attractive range of said solenoid to prevent damage thereof and said lever may be reset without deenergizing said solenoid.

JOSEPH W. THROPP.